United States Patent [19]

Martin

[11] Patent Number: 4,658,671
[45] Date of Patent: Apr. 21, 1987

[54] FLUID FRICTION CLUTCH

[75] Inventor: Hans Martin, Stuttgart, Fed. Rep. of Germany

[73] Assignee: Sueddeutsche Kuehlerfabrik Julius Fr. Behr GmbH, Stuttgart, Fed. Rep. of Germany

[21] Appl. No.: 622,747

[22] Filed: Jun. 20, 1984

[30] Foreign Application Priority Data

Jun. 24, 1983 [DE] Fed. Rep. of Germany ....... 3322779

[51] Int. Cl.$^4$ .......................... F16H 3/74; F16H 57/10
[52] U.S. Cl. ........................................ 74/751; 74/785; 74/796; 192/58 B; 192/82 T
[58] Field of Search ...................... 74/750 R, 751, 787, 74/687, 691, 214, 215, 216, 785, 752 C, 794, 796; 192/82 T, 58 B

[56] References Cited

U.S. PATENT DOCUMENTS

| | | | |
|---|---|---|---|
| 2,652,911 | 9/1953 | Somers | 74/794 X |
| 3,099,926 | 9/1963 | Thorpe | 74/752 C |
| 3,347,106 | 10/1967 | Flichy | 74/214 X |
| 3,848,476 | 11/1974 | Kraus | 74/206 |
| 4,187,731 | 2/1980 | James | 74/214 X |
| 4,190,140 | 2/1980 | Konkle et al. | 192/58 B X |
| 4,238,016 | 12/1980 | Yoshida et al. | 192/58 B |
| 4,278,158 | 7/1981 | Martin | 192/58 B |
| 4,299,141 | 11/1981 | Fairchild | 74/785 |
| 4,305,491 | 12/1981 | Rohrer | 192/58 B |
| 4,405,039 | 9/1983 | Hauser | 192/82 T X |

FOREIGN PATENT DOCUMENTS

| | | |
|---|---|---|
| 2814608 | 2/1981 | Fed. Rep. of Germany . |
| 528502 | 11/1921 | France . |
| 2071283 | 9/1981 | United Kingdom .............. 192/58 B |

Primary Examiner—Leslie Braun
Assistant Examiner—David Novais
Attorney, Agent, or Firm—Schwartz, Jeffery, Schwaab, Mack, Blumenthal & Evans

[57] ABSTRACT

Disclosed is a fluid friction clutch, wherein the force is transmitted from the driving to the driven member by means of the shear forces of a viscous medium located in gaps between the working surfaces of the driving and the driven sides. The transmittable force may be regulated by means of the degree of filling of the gap with the viscous medium as a function of external parameters. A fluid friction clutch of this type is characterized in that the drive and the driven members are elements of an at least three-member planetary transmission, wherein the individual elements of the planetary transmission engage each other through gaps, which in turn serve to receive the viscous medium, thereby effecting the transmittal of the force. It is possible with this clutch to obtain selected gear ratios between the driving and the driven members, in particular stepping up to higher speeds, even though the force is transmitted by fluid friction only. Fluid friction clutches with differential gear ratios are preferably used for driving fans to move cooling air through the radiator of internal combustion engines for automotive vehicles.

20 Claims, 3 Drawing Figures

$$n_2 = n_1\left(1+\frac{R_a}{R_i}\right)$$

4,658,671

FLUID FRICTION CLUTCH

BACKGROUND OF THE INVENTION

The present invention relates to a fluid friction clutch of the general type disclosed in German Auslegeschrift No. 28 14 608.

In fluid friction clutches of this type, the force is transferred from the driving to the driven part by means of the shear forces of a viscous medium. In the working range of the clutch, the ratio of the driven to the driving rotational speed is always less than 1, due to slippage between the drive disk and driven housing. It has heretofore been impossible to obtain an increase in the driven rotational speed with this coupling principle.

SUMMARY OF THE INVENTION

It is therefore an object of the present invention to provide an improved fluid friction clutch.

It is a particular object of the present invention to provide a fluid friction clutch in which there is an increase in the driven rotational speed, i.e., a stepping up from the driving speed.

Further objects of the invention are to obtain the increase of the driven speed with a low driving speed and to ensure that the driven speed can be reduced at higher driving speeds.

In accomplishing the foregoing objects, there has been provided in accordance with the present invention a fluid friction clutch, comprising a primary driving member; and a driven secondary member, which, along with the primary driving member, functions as an element of an at least three-member planetary transmission arrangement, wherein the driving and driven members form gaps therebetween to accept a viscous fluid medium. Preferably, the planetary transmission arrangement comprises three elements. In a preferred embodiment, the primary member of the three-element planetary transmission comprises a disk member bearing a plurality of planetary wheels rotationally secured thereto, wherein the secondary member comprises an inner sun wheel, carrying a driven disk, wherein the tertiary member comprises an outer sun wheel which forms a clutch housing, and wherein the planetary wheels form gaps with both the inner and outer sun wheels. Usually, the fluid friction clutch further comprises means for braking the tertiary member.

Further objects, features and advantages of the present invention will become apparent from the detailed description of preferred embodiments which follows, when considered together with the attached figures of drawing.

DETAILED DESCRIPTION OF PREFERRED EMBODIMENTS

Figure 1:
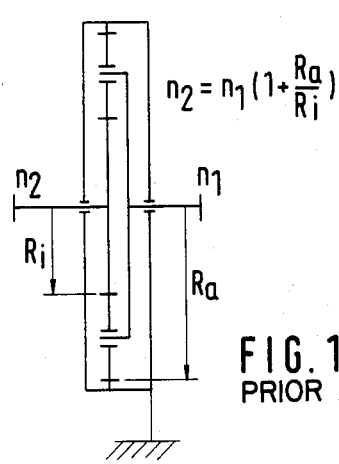
FIG. 1 is a schematic representation of a known planetary gear with toothed gear engagements.
Figure 3:
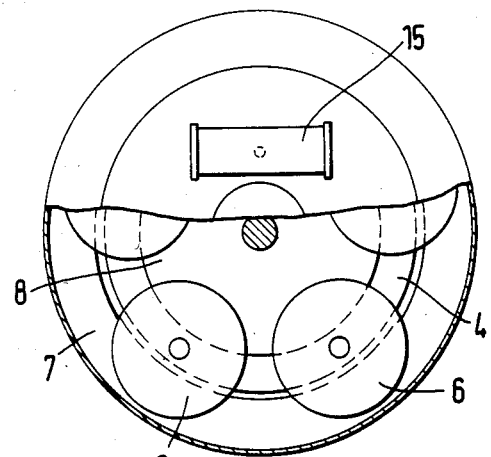
FIG. 3 is a front view, partially cut away, of the clutch according to FIG. 2 in the direction of the clutch axis (X direction).

In the present invention, the principle of a planetary gear is combined with the principle of a fluid friction clutch, to make both stepping up to higher speed and variation of the transmission ratio possible. The clutch is therefore capable of operating, on the one hand, as a transmission or converter, and, on the other, as purely a slip clutch. Such a dual function is of great advantage especially for clutches installed to drive cooling fans on internal combustion engines. A higher rotational speed of the fan with a low driving speed, i.e., at a low rpm of the engine, results in improved cooling of the engine by increase in the flow of cooling air through the radiator.

The low engine rpm range is decisive in determining the dimensions of the cooling system, particularly the water/air radiator. Thus, increased fan rpm in this range will allow radiator heat exchange surface, and also its cost, to be reduced. In the case of vehicles with air-conditioning, a condenser with a supplemental electric fan is located in front of the radiator. This fan can be eliminated by increasing the rotational speed of the radiator fan. By means of an appropriate stepping up, the fan behind the radiator alone is capable of providing adequate cooling air for the air-conditioning condenser.

According to the present invention, the planetary transmission preferably consists of three elements, the simplest form of a planetary drive. The first two elements of the transmission are the drive, effected by means of the flange, and the power take-off effected by means of the inner sun. The third element is the clutch housing which rotates or can be braked. In the latter case, the approximate gear ratio known for a corresponding planetary transmission is established between the drive and the power take-off. If, on the other hand, the clutch housing, which has the gear kinematic configuration of an outer sun, rotates, a gear ratio of less than 1 is obtained between the drive member and the driven member.

The clutch housing (in accordance with common practice) is divided by a partition into a reservoir and a work chamber, wherein the flow of the shear fluid into the work chamber is controlled by means of a valve. The transmission elements engaging each other are arranged in the work chamber. The degree of filling of the work chamber determines the peripheral forces transmitted between the transmission elements and thus the rotational speed of the driven member. If there is no shear fluid in the work chamber, as the result of closing the valve, for example, no peripheral forces are transmitted between the transmission elements, so that the driven speed is equal to zero or to a low idle rpm. When the valve is open, shear fluid flows into the work chamber, the gap between the gear elements is filled, and the clutch increases with respect to its driven speed. The principle of the proportional control of the driven speed is thus preserved.

The gap is preferably in the form of an axial gap, with an arbitrary number of gaps being possible. By means of this multiplication of the axial gaps between the mutually engaging transmission elements, the peripheral forces which may be transmitted can be multiplied proportionally.

A simple design configuration of the three elements planetary transmission is obtained, by designing the planetary wheels in the form of double disks with an axial gap, which are engaged from the inside by the driven disk (inner sun) and from the outside by the clutch housing (outer sun). Between the planetary wheels of the inner sun and the outer sun, slip connection is established in keeping with the principle of a fluid friction clutch, which assures that peripheral forces are transmitted between the transmission elements as in a planetary transmission of a conventional type. The gear ratios obtained in the process correspond to those of conventional rotating gear drives.

Another reservoir is preferably provided in the rotating primary member, i.e., in the flange of the planetary transmission. By means of this reservoir, equipped with a centrifugally actuated valve, the shear fluid contained in the work chamber may be pumped into the reservoir on the primary side, so that low peripheral forces are transmitted in the work chamber and the driven speed is reduced. The reservoir on the primary side thus provides a second control variable, the drive speed, for the regulation of the driven speed.

Controls between the work chamber and the reservoir on the tertiary side are temperature dependent, i.e., as a function of the cooling air and coolant temperature. In this manner, the driven speed and the rpm of the fan, respectively, are regulated approximately in proportion to the temperature.

This regulation is effected by means of a bimetal element, i.e., as a function of the temperature of the cooling air impacting the front side of the clutch.

The driven part of the clutch extends as a shaft from the clutch housing and carries the fan, which moves the cooling air through the radiator, thereby determining the cooling temperature. This design enables the installation of a fluid friction clutch with built-in stepping up means in a novel manner, without the need for structural alterations of the engine or the vehicle.

An exemplary preferred embodiment of the invention is shown in the drawing and shall be described in detail below.

FIG. 1 shows a known planetary or revolving transmission in a schematic representation, wherein the drive is effected by means of the flange having a driven speed $n_1$, the secondary part is driven by means of the inner sun having a rotational speed $n_2$, and the outer sun in the form of the housing is held stationary. In this case, the rotational speed of the driven member is given by the relationship:

$$n_2 = n_1 \times (1 + R_a/R_i)*$$

* (Wolf, "Die Grundsaetze der Umlaufgetriebe" ("The Fundamental Principles of Planetary Gears"), Vieweg-Verlag, 1958)

In common planetary transmissions, the force is transmitted between the individual gear elements without slipping.

Figure 2:
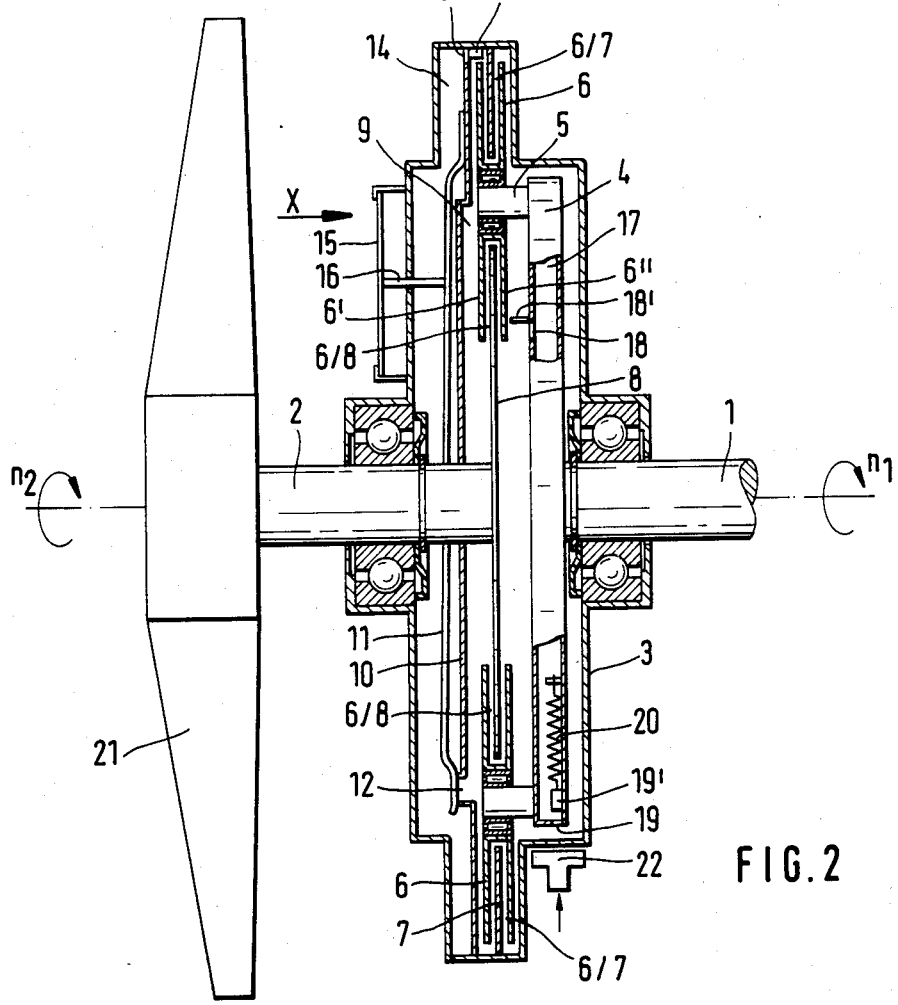
FIG. 2 is a cross-sectional view of the fluid friction clutch according to the invention with planetary arrangement.

The fluid friction clutch with planetary transmission, according to the invention, is shown in FIG. 2. It is similar to that shown in FIG. 1, except that here the force is transmitted by means of a shear fluid with slippage. The fluid friction clutch is driven by means of the drive shaft 1. The power is taken off by means of the driven shaft 2. A clutch housing 3 is rotatably mounted on the drive shaft 1 and on the driven shaft 2. The housing is optionally kept stationary by a brake 22 to maintain specific gear ratios. To function in the sense of a planetary gear, the drive shaft 1 is designed as a flange-like shaft and carries the drive disk 4. Several planetary wheels 6, which rotate on journals 5, are distributed over the circumference of the drive disk 4. The planetary wheels are designed as so-called double disks, wherein two disks 6' and 6", arranged in a plane parallel manner with respect to each other, form an axial gap between themselves. The annular disk 7, fixedly connected with the clutch housing 3, projects into the axial gap of the planetary wheels on one side, while the driven disk 8, fixedly connected with the driven shaft 2, projects into the gap on the other side. Annular disk 7 and the driven disk 8 are arranged in the center of the axial gap of the planetary wheels 6, so that axial gap 6/7 is created between the annular disk 7 and the planetary wheel 6, and axial gap 6/8 is created between the driven disk 8 and the planetary wheel 6. Both axial gaps are fillable or wettable by a shear fluid, for example, a commercial silicone oil. The planetary wheels 6, the driven disk 8 and the annular disk 7 engaging it, are arranged in a work chamber 9, which is divided by a partition 10 in the clutch housing 3.

The partition 10 has a valve orifice 12 on one side which may be opened and closed by means of a valve lever 11 mounted elastically on the partition 10. On the other side, partition 10 has a return bore 13 with an associated baffle body 13'. On the side facing away from the work chamber 9 of the partition 10, a reservoir 14 is located, it being connected by means of the valve orifice 12 and the return bore 13 with the work chamber 9. The valve lever 11 may be controlled by means of a temperature-sensitive element, a bimetal element 15, arranged on the outside of the clutch housing 3, with an actuating pin 16. The valve lever 11 itself forms the return spring.

The drive disk 4 is in the form of a hollow disk, within which is located reservoir 17 which is connected with the work chamber 9 through an inflow bore 18 and a baffle 18' associated with it. The reservoir 17 further has an outlet orifice 19, which may be closed by a centrifugally controlled valve 19' and reopened by a return spring 20.

A fan 21 is mounted on the driven shaft 1; it is arranged behind the water cooled radiator of a water cooled internal combustion engine, to move the cooling air through the radiator.

The (heated) air coming from the radiator—not shown—thus impacts the bimetal element 15 located on the front side of the clutch.

The entire clutch may be mounted either by means of the drive shaft 1 opposite the internal combustion engine (not shown) or it may be fixedly joined to the internal combustion engine, if the clutch housing is to be braked permanently.

The mode of operation of the fluid friction clutch is as follows:

In this state of operation shown in FIG. 2, relatively cold air is impacting the bimetal element 15 so that it assumes an extended (straight) position, thereby maintaining the valve lever 11 in the closing position over the actuating pin 16. The clutch is being driven with a relatively low rotational speed (lower rpm range) by the drive shaft 1 and the the drive disk 4. As the result of the relative number of revolutions between the clutch housing 3 and the planetary wheels 6, any oil present in the work chamber 9 is moved by way of the baffle 13' and the return bore 13 into the reservoir 14, until only a minimal amount of oil or no oil at all remains in the work chamber 9. The clutch is then inactivated or runs only at an idle speed, as there is no shear fluid in the gaps 6/7 and 6/8, so that no torque can be transmitted.

If the clutch continues to be driven in the lower rpm range by the drive shaft 1 and simultaneously the air impacting the bimetal element 15 is heated by the rising temperature of the cooling water, the bimetal element 15 will bulge toward the outside, so that the actuating pin 16, and with it the valve lever 11, are able to follow this bulging motion of the bimetal element.

The valve lever 11 is then lifted from the valve orifice 12, and the oil present in the reservoir 14 flows into the work chamber 9 and wets the gaps 6/7 and 6/8, thereby rendering possible the transmission of peripheral forces by means of the shear fluid between the planetary wheels 6 of the annular disk 7 and the driven disk 8. The individual clutch elements, the drive shaft 1, the planetary wheels 6 and the driven shaft 2 in the process behave similarly to the toothed planetary gear explained in FIG. 1, with the difference, however, that a certain slip occurs in the case of the fluid friction drive in the gaps 6/7 and 6/8 wetted by the shear fluid, as is common to fluid friction clutches. Corresponding to the diameter ratio selected for the annular disk 7 and the driven disk 8, analogously to the radii $R_a$ and $R_i$ in FIG. 1, stepping up will now take place from the drive shaft 1 to the driven shaft 2, i.e., the fan 21 will rotate at a higher speed than the drive shaft 1, provided the clutch housing 3 remains stationary. This increase in the rotational speed of the fan is desirable in the lower rpm range of the internal combustion engine to improve cooling.

If the temperature of the air continues to be higher than the actuating temperature of the bimetal element 15 and if the clutch is now being driven by means of the drive shaft 1 with a relatively high rpm (upper rpm range), the centrifugally controlled valve 19, 19' begins to function.

The valve closing element 19 moves radially outwardly against the force of the return spring 20, thereby closing the outlet bore 19' of the reservoir 17. Simultaneously, the baffle 18 on the drive disk 4 continuously moves oil into the reservoir 17 through the inlet bore 18' by stripping oil from the outside of the disk 6" of the planetary wheel 6. The baffle 18 fastened to the drive disk 4 thus constantly engages the planetary wheel 6 and continuously transports the oil entrained by the planetary wheel 6 on the outside into the reservoir 17. Due to the fact that the reservoir 17 is now closed by the valve 19, the oil accumulates therein, i.e., it is transferred from the work chamber 9 and the gaps 6/7 and 6/8 into the reservoir 17. Consequently, no peripheral forces are transmitted between the annular disk 7 and the planetary wheels 6, i.e., the rotational speed of the driven member is reduced to the idle speed.

If the clutch is driven in an intermediate rpm range, the clutch housing 3 is released so that it is able to rotate. The release of the clutch housing 3, which has heretofore been immobilized by the brake 22, may be effected by appropriate automatic means as a function of the drive speed, the temperature of the cooling medium or the requirements of the air-conditioning installation. As long as there is shear fluid in the work chamber 9 and the axial gaps 6/7 and 6/8, the clutch housing 3 and the driven disk 8 are entrained by the peripheral forces on the planetary wheels 6, and a driven speed will be established which is lower than the driving speed, i.e., the stepping-up action is shut off, and the fluid friction clutch will again operate as a clutch and not as a converter.

The invention is not restricted to the specific embodiment shown and described. In a three-member configuration of the planetary transmission it is possible, for example, to immobilize, i.e., brake the flange, effect the drive by means of a clutch housing, i.e., drive the outer sun, and to drive the secondary side by means of the inner sun. In such a case, a stepping up would again be obtained. The centrifugal valve would then have to be mounted on the driving outer sun. Such a solution may have particular advantages with respect to incorporation of the invention in motor vehicles.

What is claimed is:

1. A fluid friction clutch, comprising:
a primary driving member; and
a driven secondary member, said primary driving member and said driven secondary member comprising elements of an at least three-member planetary transmission arrangement, wherein each of the planetary elements of said at least three member planetary transmission are physically nonengaged and include respective fluid friction clutch surfaces which are always separated from one another by a gap therebetween for receiving therein a viscous fluid medium for transmitting driving force between said driving and driven members, whereby driving force is selectively transmitted only when the viscous fluid medium is present in the gap.

2. A fluid friction clutch according to claim 1, wherein said gap is an axial gap.

3. A fluid friction clutch according to claim 1, wherein said planetary transmission arrangement comprises three elements including a tertiary member.

4. A fluid friction clutch according to claim 3, wherein the primary member of said three-element planetary transmission comprises a disk member bearing a plurality of planetary wheels rotationally secured thereto, wherein the secondary member comprises an inner sun wheel, carrying a driven disk, wherein the tertiary member comprises an outer sun wheel which forms a clutch housing, and wherein said planetary wheels are separated from both said inner and outer sun wheels for receiving a viscous fluid medium therein for transmitting a driving force.

5. A fluid friction clutch according to claim 4, further comprising means for selectively braking said tertiary member.

6. A fluid friction clutch according to claim 4, wherein said clutch housing contains a partition therein defining a work chamber and a reservoir separated by the partition, wherein a controlled fluid connection connects said work chamber with said reservoir, and wherein said work chamber contains the primary and secondary members of the planetary transmission arrangement.

7. A fluid friction clutch according to claim 4, wherein said planetary wheels comprise dual disks having dual spaced fluid friction clutch surfaces defining one axial gap, wherein said inner sun wheel comprises a single disk having fluid friction clutch surfaces on both sides, wherein said outer sun wheel comprises a single annular disk having fluid friction clutch surfaces on both sides and wherein said inner and outer sun wheels are positioned to extend into the axial gap of the dual disk, thereby forming two axial gaps defined by fluid friction clutch surfaces between said inner sun wheel and said dual planetary disks and also between said outer sun wheel and said dual planetary disks.

8. A fluid friction clutch according to claim 4, wherein said primary member comprises an internal reservoir having a centrifugally controlled valve arranged at a radially outward location, and at least one radially inwardly located baffle having an overflow orifice, said baffle continuously engaging near at least one planetary wheel to establish the circulation of the viscous fluid through the reservoir of the primary member.

9. A fluid friction clutch according to claim 4, wherein said driven secondary member extends as a shaft from the clutch housing and includes a fan mounted upon said shaft.

10. A fluid friction clutch according to claim 6, further comprising means for regulating said fluid connection between the work chamber and the reservoir as a function of temperature.

11. A fluid friction clutch according to claim 10, wherein said fluid connection regulating means comprises a bimetal element mounted on the outside of the clutch housing.

12. A fluid friction clutch, comprising:
a primary driving member;
a secondary driven member, wherein said driving and driven members are physically nonengaged and include respective fluid friction clutch surfaces separated from one another by a gap;
means for selectively introducing a viscous fluid medium into said gap for selectively transmitting a driving force between said driving and driven members; and
means selectively stepping-up output of said driven member to a rotational speed greater than that of said driving member, wherein the driving force is transmitted in the fluid friction clutch solely by the viscous fluid medium.

13. A fluid friction clutch according to claim 12, wherein said stepping-up means include an at least three-member planetary transmission arrangement which includes said driving and driven members.

14. A fluid friction clutch according to claim 13, wherein said planetary transmission arrangement comprises three elements, including a tertiary member.

15. A fluid friction clutch according to claim 14, wherein the primary member comprises a member bearing a plurality of planetary wheels rotationally secured thereto, wherein the secondary member comprises an inner sun wheel, carrying a driven disk, wherein the tertiary member comprises an outer sun wheel which forms a clutch housing, and wherein said planetary wheels are separated from both said inner and outer sun wheels by gaps for receiving therein the viscous fluid medium for transmitting the driving force.

16. A fluid friction clutch according to claim 15, further comprising means for selectively braking said tertiary member.

17. A fluid friction clutch according to claim 15, wherein said clutch housing contains a partition therein defining a work chamber and a reservoir separated by the partition, wherein a controlled fluid connection connects said work chamber with said reservoir, and wherein said work chamber contains said primary and secondary members.

18. A fluid friction clutch according to claim 17, further comprising means for regulating said fluid connection between the work chamber and the reservoir as a function of temperature.

19. A fluid friction clutch according to claim 15, wherein said gaps are axial gaps.

20. A fluid friction clutch according to claim 15, wherein said planetary wheels comprise dual disks having dual spaced fluid friction clutch surfaces defining one axial gap, wherein said inner sun wheel comprises a single disk having fluid friction clutch surfaces on both sides, wherein said outer sun wheel comprises a single annular disk having fluid friction clutch surfaces on both sides, and wherein said inner and outer sun wheels are positioned to extend into the axial gap of the dual disk, thereby forming two axial gaps defined by fluid friction clutch surfaces between said inner sun wheel and said dual planetary disks and also between said outer sun wheel and said dual planetary disks.

* * * * *